United States Patent
Yamasaki

(10) Patent No.: US 10,278,472 B2
(45) Date of Patent: May 7, 2019

(54) DRAWING DEVICE AND INSERTION CASE

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 79 days.

(21) Appl. No.: 15/488,548

(22) Filed: Apr. 17, 2017

(65) Prior Publication Data
US 2017/0367459 A1 Dec. 28, 2017

(30) Foreign Application Priority Data
Jun. 28, 2016 (JP) ................. 2016-127118

(51) Int. Cl.
| | |
|---|---|
| *G06K 15/00* | (2006.01) |
| *A45D 29/22* | (2006.01) |
| *A45D 34/04* | (2006.01) |
| *B41J 29/02* | (2006.01) |
| *H04N 5/232* | (2006.01) |
| *A45D 29/00* | (2006.01) |

(52) U.S. Cl.
CPC ............ *A45D 29/22* (2013.01); *A45D 34/04* (2013.01); *B41J 29/02* (2013.01); *H04N 5/23229* (2013.01); *H04N 5/23296* (2013.01); *A45D 2029/005* (2013.01)

(58) Field of Classification Search
None
See application file for complete search history.

(56) References Cited

U.S. PATENT DOCUMENTS

| | | | | | |
|---|---|---|---|---|---|
| 5,130,553 | A | * | 7/1992 | Amoh | A45D 31/00 132/73.5 |
| 5,282,276 | A | * | 2/1994 | Preiose | A45D 29/00 132/73 |
| 6,035,860 | A | * | 3/2000 | Mombourquette | A45D 29/00 132/200 |
| 6,085,757 | A | * | 7/2000 | Jenkins | A45D 29/00 101/41 |
| 6,336,694 | B1 | * | 1/2002 | Ishizaka | A45D 29/00 347/105 |
| 6,525,724 | B1 | * | 2/2003 | Takami | A45D 29/00 345/418 |
| 2003/0023171 | A1 | * | 1/2003 | Sato | A61B 5/14552 600/476 |
| 2012/0024307 | A1 | * | 2/2012 | Nguyen | A45D 29/00 132/200 |

(Continued)

FOREIGN PATENT DOCUMENTS

JP    2000194838 A    7/2000

*Primary Examiner* — Ted W Barnes
(74) *Attorney, Agent, or Firm* — Holtz, Holtz & Volek PC

(57) ABSTRACT

A drawing device includes an insertion case into which an object that is a finger or a toe having a nail to be drawn is inserted, and including a first surface provided with an opening area that exposes the nail in a state where the object is inserted and a second surface provided in a direction crossing the first surface, and an insertion area into which the insertion case is detachably inserted. An area of at least a part of the second surface, the area being corresponding to the nail in a state where the object is inserted, has transparency allowing an inside of the insertion case to be visible.

17 Claims, 10 Drawing Sheets

(56) References Cited

U.S. PATENT DOCUMENTS

| | | | |
|---|---|---|---|
| 2014/0231677 A1* | 8/2014 | Cheng | A45D 29/00 250/492.1 |
| 2014/0267517 A1* | 9/2014 | Yamasaki | B41J 3/4073 347/101 |
| 2016/0088197 A1* | 3/2016 | Yamasaki | H04N 5/225 132/73.6 |
| 2017/0036456 A1* | 2/2017 | Legallais | B41J 29/393 |

* cited by examiner

FIG. 4B  FIG. 4A  FIG. 4C
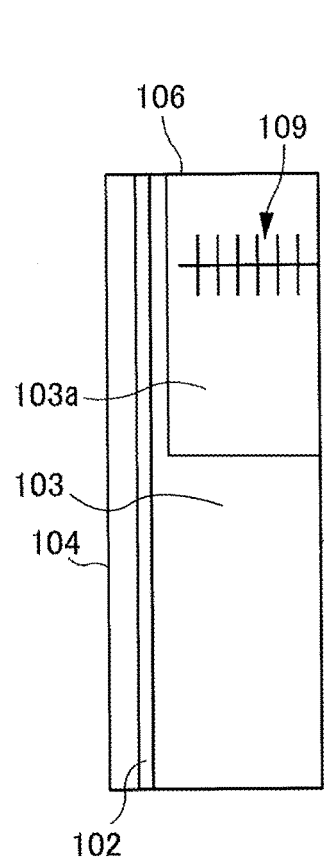
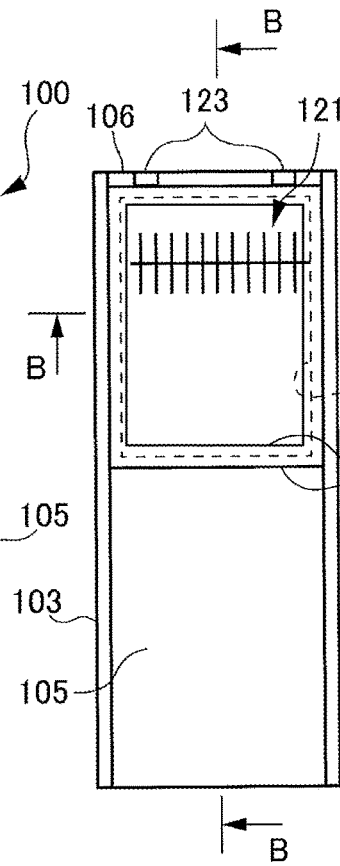
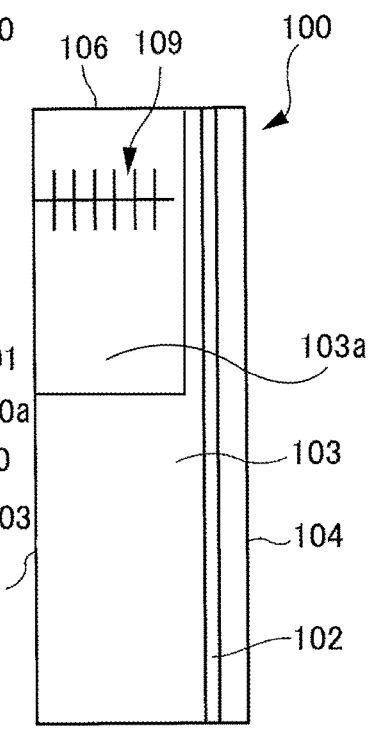
FIG. 4D
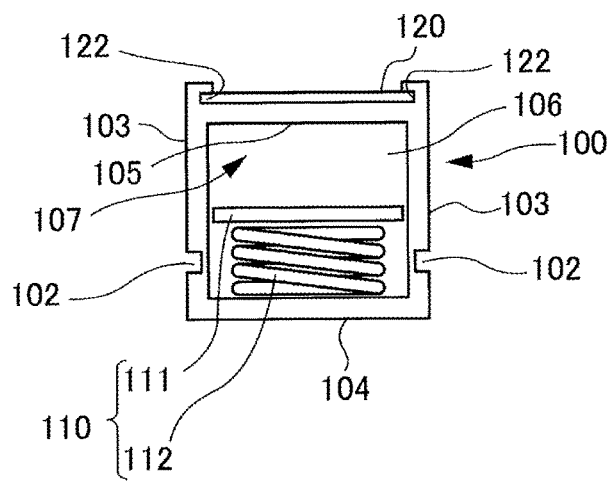

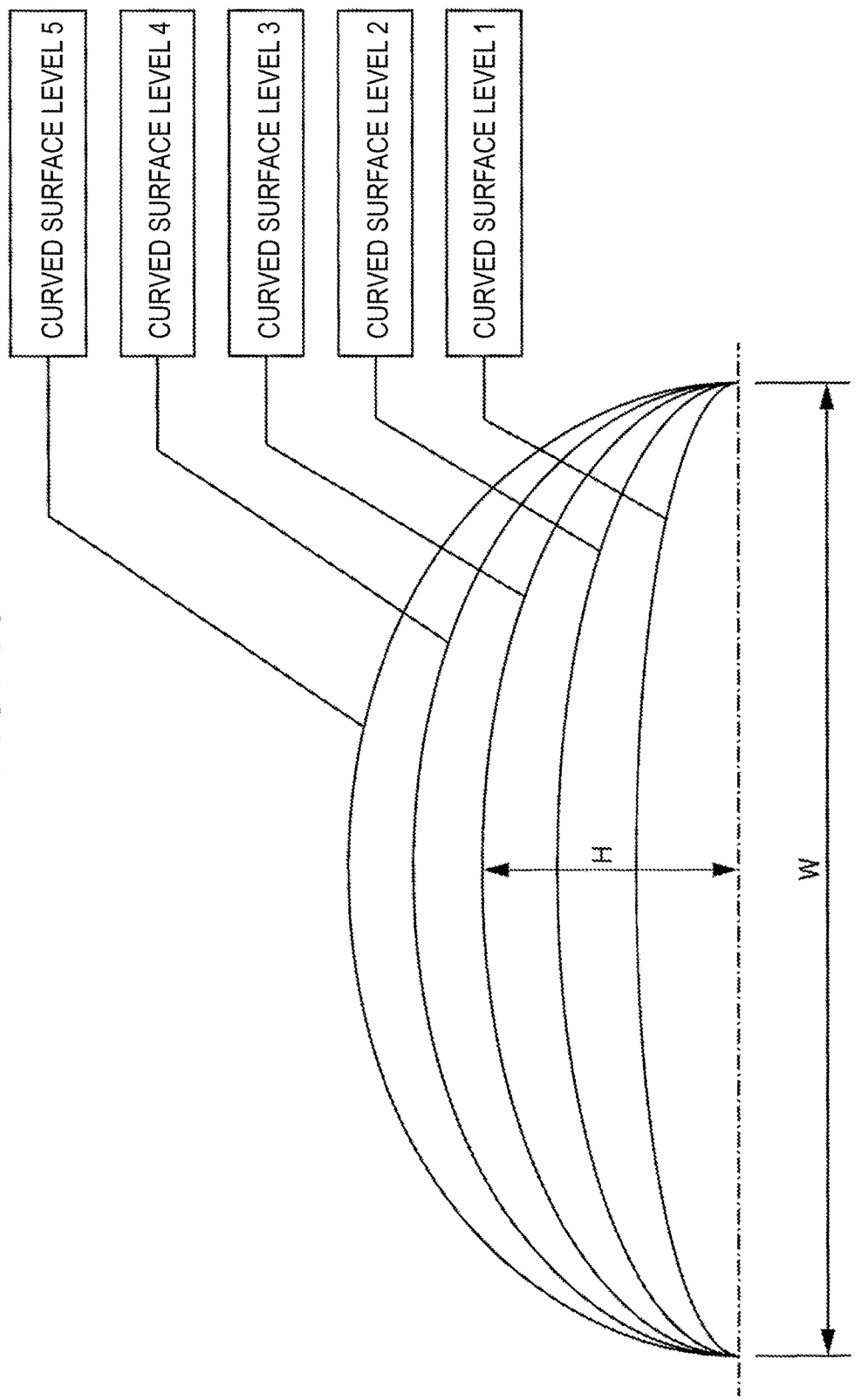

DRAWING DEVICE AND INSERTION CASE

CROSS-REFERENCE TO RELATED APPLICATIONS

The present application claims priority of Japanese Patent Application No. 2016-127118, filed on Jun. 28, 2016, the entire contents of which are incorporated herein by reference.

BACKGROUND OF THE INVENTION

1. Field of the Invention

The present invention relates to a drawing device that applies nail design to a nail and an insertion case.

2. Description of the Related Art

In recent years, drawing devices having a structure into which a finger is insertable, and which apply nail design to the inserted nail of the finger have been proposed. Such a drawing device is described in JP 2000-194838 A, for example. The drawing device of this sort includes a camera (image acquisition device) that acquires an image of the nail, and is configured to identify a drawing area of the nail (a contour of the nail) on the basis of the image acquired by the camera, and draw desired nail design on the drawing area.

By the way, a curved surface state of the nail has individual difference. Therefore, there is a problem that the drawn nail design is distorted if the image to be drawn is not appropriately corrected in accordance with the curved surface states of the nails.

Therefore, the above document describes measurement of the curved surface state of the nail by a spot light projecting method, a slit light projecting method, a step light projecting method, a spatial coding pattern light projecting method, or the like.

However, the drawing device described in the above document needs to be provided with a laser as a light source in order to use the spot light projecting method, the slit light projecting method, the step light projecting method, or the spatial coding pattern light projecting method. Therefore, an increase in the cost is incurred, and the measurement takes relatively long time.

BRIEF SUMMARY OF THE INVENTION

The present invention can provide a drawing device and an insertion case that enable easy measurement of a curved surface state of a nail, and has an advantage.

To achieve the above advantage, the present invention provides a drawing device including:

an insertion case into which an object that is a finger or a toe having a nail to be drawn is inserted, and including a first surface provided with an opening area that exposes the nail in a state where the object is inserted and a second surface having a plane direction intersecting with a plan direction of the first surface; and an insertion area into which the insertion case is detachably inserted, wherein a first area of at least a part of the second surface, the first area being corresponding to the nail in a state where the object is inserted, has transparency allowing an inside of the insertion case to be visible.

To achieve the above advantage, the present invention provides an insertion case into which an object that is a finger or a toe having a nail to be drawn, is inserted, the insertion case including a first surface provided with an opening area that exposes the nail in a state where the object is inserted and a second surface having a plane direction intersecting with a plan direction of the first surface, wherein a first area of at least a part of the second surface, the first area being corresponding to the nail in a state where the object is inserted, has transparency allowing an inside of the insertion case to be visible, and the insertion case is detachably inserted to a drawing device that applies drawing to the nail.

BRIEF DESCRIPTION OF THE SEVERAL VIEWS OF THE DRAWING

FIGS. 4A, 4B, 4C, and 4D are diagrams illustrating the finger insertion case of the drawing device according to the first embodiment of the present invention, FIG. 4A is a plan view of the finger insertion case, FIG. 4B is a left side view of the finger insertion case, FIG. 4C is a right side view of the finger insertion case, and FIG. 4D is a front view of the finger insertion case;

FIG. 6A is a schematic left side view illustrating the finger insertion case at the time of insertion of a finger, FIG. 6B is a schematic left side view of the finger insertion case, illustrating a state of measuring the height of the nail from a left side, FIG. 6C is a schematic right side view of the finger insertion case, illustrating a state of measuring the height of the nail from a right side, and FIG. 6D is a schematic plan view of the finger insertion case, illustrating a state of measuring the width of the nail from above;

FIG. 8A is a schematic front view illustrating a finger insertion case and mirror units, FIG. 8B is a schematic front view illustrating an image capturing range of an image acquisition device, and FIG. 8C is a diagram illustrating an example of an acquired image of the image acquisition device;

FIG. 9A is a sectional view, and FIG. 9B is an enlarged view of an error h; and FIG. 10 is an explanatory view of curved surface levels of the nail.

DETAILED DESCRIPTION OF THE INVENTION

Hereinafter, embodiments for implementing the present invention (hereinafter, referred to as "embodiments") will be described in detail with reference to the drawings.

Note that the same element is denoted with the same number throughout the entire description of the embodiments.

In the following embodiments, description will be given, assuming that a drawing device performs drawing on a nail of a finger, where the finger of the hand is an object, and the nail of the finger of the hand is an object to be drawn. However, the object to be drawn of the present invention is not limited to the nail of the finger of the hand. For example, a toe may be the object, and a nail of the finger of the foot may be the object to be drawn.

(First Embodiment)

First, a drawing device 10 according to a first embodiment of the present invention will be described with reference to the drawings.

(Overall Configuration of Drawing Device)

Figure 1:
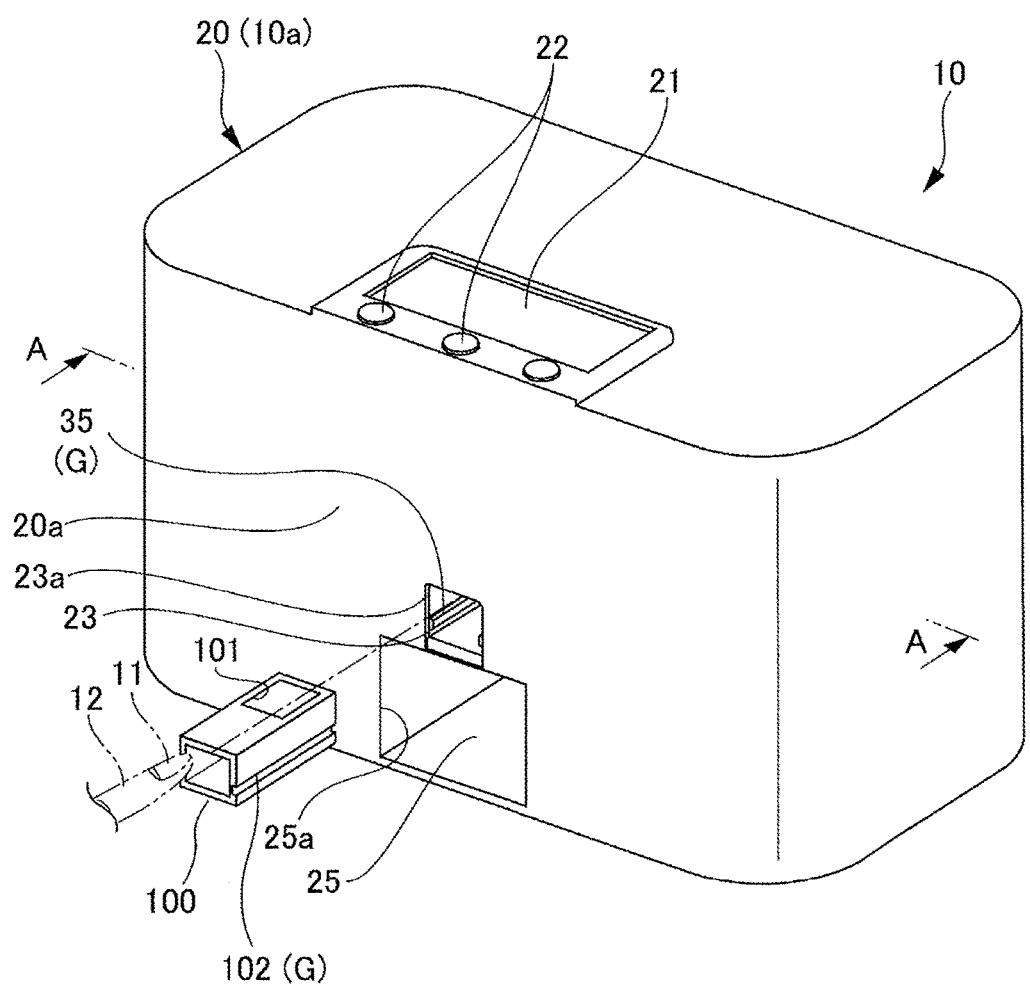
FIG. 1 is a perspective view illustrating an appearance of a drawing device according to a first embodiment of the present invention.

FIG. 1 is a perspective view illustrating an appearance of the drawing device 10 according to the first embodiment of the present invention.

Figure 2:
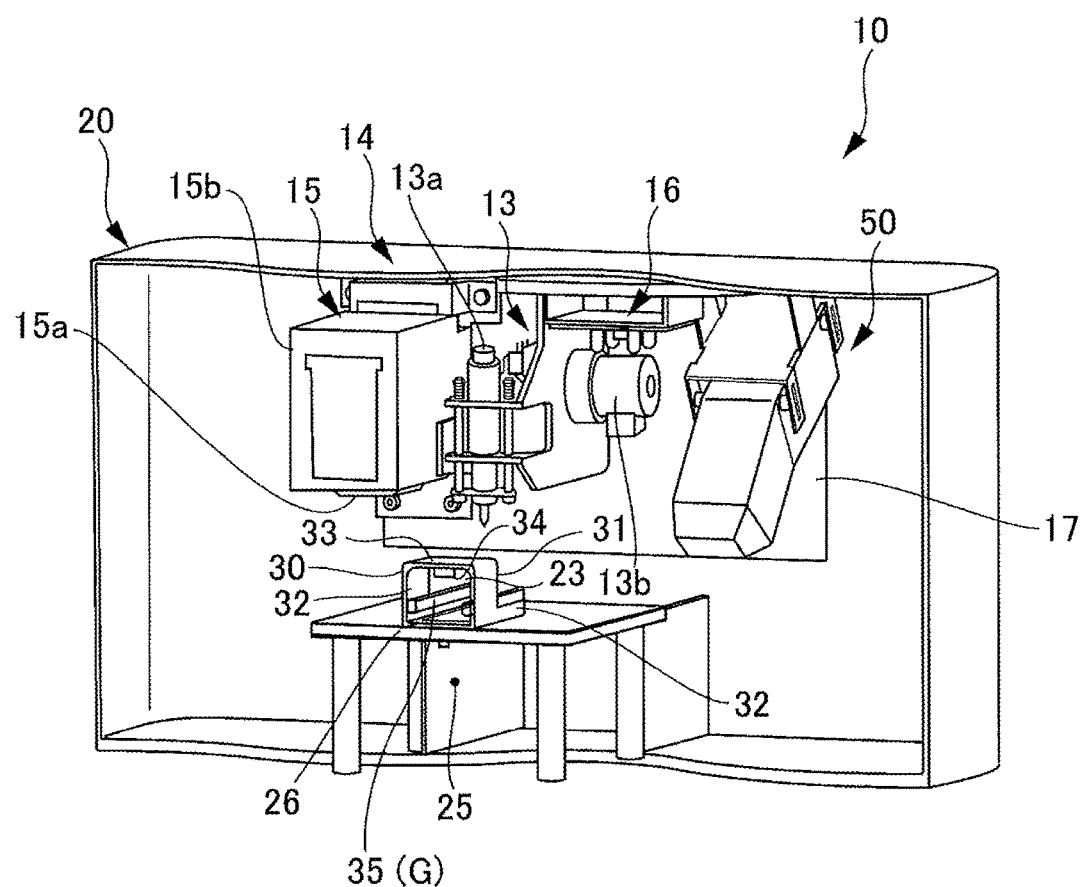
FIG. 2 is a perspective view of a housing of the drawing device, which is cut by an A-A line in FIG. 1 and viewed.

FIG. 2 is a perspective view of a housing 20 of the drawing device 10 of FIG. 1, which is cut by an A-A line and viewed.

As illustrated in FIG. 1, the drawing device 10 is a device that has a drawing function, and applies drawing of nail design to a nail 11 of a finger 12 of a person.

The drawing device 10 includes a housing 20. A display device 21 and an operation device 22 are provided on an upper surface (top plate) of the housing 20. A state of progress of the drawing, a message to a user, and the like are displayed on the display device 21. The user can perform various input operations by operating the operation device 22.

An insertion opening 23a of a first finger insertion area 23 is open in a lower center of a front surface portion 20a of the housing 20. An insertion opening 25a of a second finger insertion area 25 is open in a lower side of the first finger insertion area 23.

The first finger insertion area 23 is a space into which a finger insertion case 100 described below is detachably inserted, and is formed from the front surface portion 20a of the housing 20 toward a depth side as an inserting direction of the finger 12.

The second finger insertion area 25 is a space into which fingers other than the finger 12 having the nail 11 as an object to be drawn, of fingers belonging to one hand, are inserted, and is a space formed from the front surface portion 20a of the housing 20 toward the depth side as the inserting direction of the finger 12, and independent of an internal space of the housing 20 (not communicating with the internal space).

As illustrated in FIG. 2, a finger placing table 26 is provided in a lower portion in the housing 20, and a square cylindrical insertion guide 30 formed along a front and back direction is provided on an upper surface of the finger placing table 26.

An internal space of the insertion guide 30 is a space for forming the first finger insertion area 23 into which the finger insertion case 100 is inserted, and a notched portion 31 for exposing the inserted finger insertion case 100 upward at a depth side is formed in the internal space at the depth side.

Note that relationship between the insertion guide 30 and the finger insertion case 100 will be described in detail below.

Meanwhile, a fixing plate 17 is provided in an upper portion in the housing 20 in a movable manner in a width direction and a depth direction of the drawing device 10.

A drawing head 14 including a pen plotter device 13 and an inkjet device 15, an image acquisition device 16, and a dryer 50 are fixed to the fixing plate 17 in a state of aligning in the width direction of the drawing device 10.

Therefore, when the fixing plate 17 is moved in the width direction and the depth direction of the drawing device 10, the drawing head 14 including the pen plotter device 13 and the inkjet device 15, the image acquisition device 16, and the dryer 50 are moved in the width direction and the depth direction of the drawing device 10 together with the fixing plate 17.

Note that FIG. 2 illustrates an inside of the drawing device 10 of when the pen plotter device 13 is moved upward in a vertical direction with respect to the notched portion 31 of the insertion guide 30.

The pen plotter device 13 is a unit that draws an undercoat on the surface of the nail 11, for example, and includes a pen 13a that applies drawing to the nail 11. The pen plotter device 13 can lift the pen 13a in the vertical direction by driving devices 13b such as a stepping motor.

The pen plotter device 13 is movable in the width direction, the depth direction, and the vertical direction of the drawing device 10 with the movement of the fixing plate 17. The pen plotter device 13 can perform drawing on the surface of the nail 11 with a pen point of the pen 13a that is lowered to come in contact with the surface of the nail 11 after the pen 13a is moved right above an opening area 101 of the finger insertion case 100.

The inkjet device 15 is a unit that prints the design on the surface of the nail 11, and includes, for example, an inkjet head 15a and an inkjet cartridge 15b.

Similarly to the pen plotter device 13, the inkjet device 15 is moved right above the opening area 101 of the finger insertion case 100 with the movement of the fixing plate 17, and can apply a desired design to the surface of the nail 11 with the inkjet head 15a.

The image acquisition device 16 is a camera that acquires an image of the nail 11, for example, and functions as image acquisition device that acquires an image including the nail 11 that serves as the object to be drawn.

Then, by analyzing the image of the finger 12 including the nail 11, an area of the nail 11 that serves as the object to be drawn is identified, and the position of the nail 11 that serves as the object to be drawn is also identified.

The dryer 50 is integrally movable with the fixing plate 17, as described above, and dries an ink applied to the nail 11 with warm air by being moved right above the opening area 101 of the finger insertion case 100, and blowing drying air to the surface of the nail 11.

Referring back to FIG. 1, the drawing device 10 includes the finger insertion case 100 detachable from the first finger insertion area 23 of a drawing device main body 10a.

After the finger 12 having the nail 11 that serves as the object to be drawn is inserted into the finger insertion case 100 detached from the drawing device main body 10a, the finger 12 is inserted into the first finger insertion area 23 together with the finger insertion case 100.

(Configuration of Finger Insertion Case)

Figure 3:
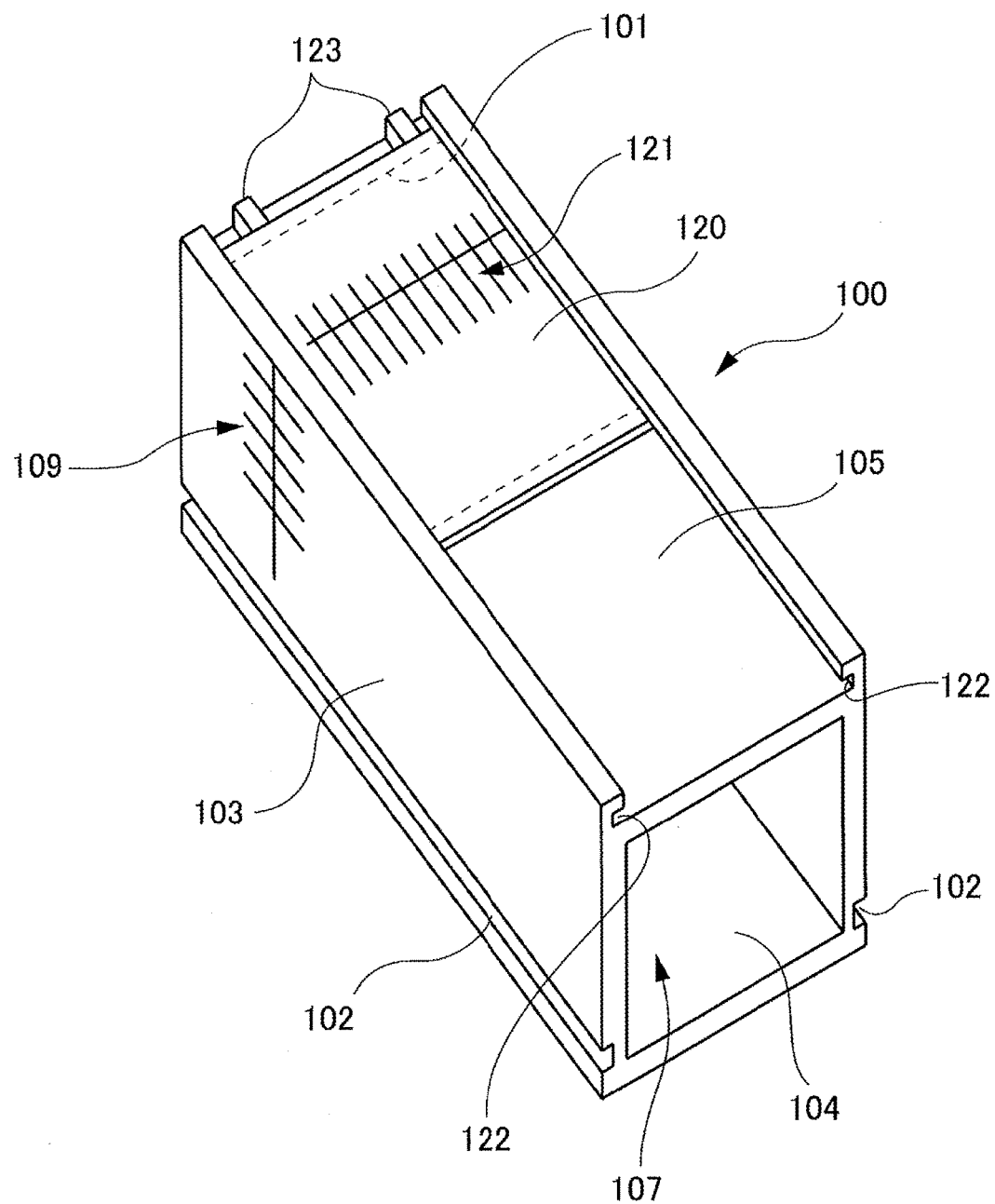
FIG. 3 is a perspective view illustrating a finger insertion case of the drawing device according to the first embodiment of the present invention.

FIG. 3 is a perspective view illustrating a finger insertion case 100 of the drawing device 10 according to the first embodiment of the present invention.

FIGS. 4A, 4B, 4C, and 4D are diagrams illustrating the finger insertion case 100 of the drawing device 10 according to the first embodiment of the present invention, FIG. 4A is a plan view of the finger insertion case 100, FIG. 4B is a left side view of the finger insertion case 100, FIG. 4C is a right side view of the finger insertion case 100, and FIG. 4D is a front view of the finger insertion case 100

Figure 5:
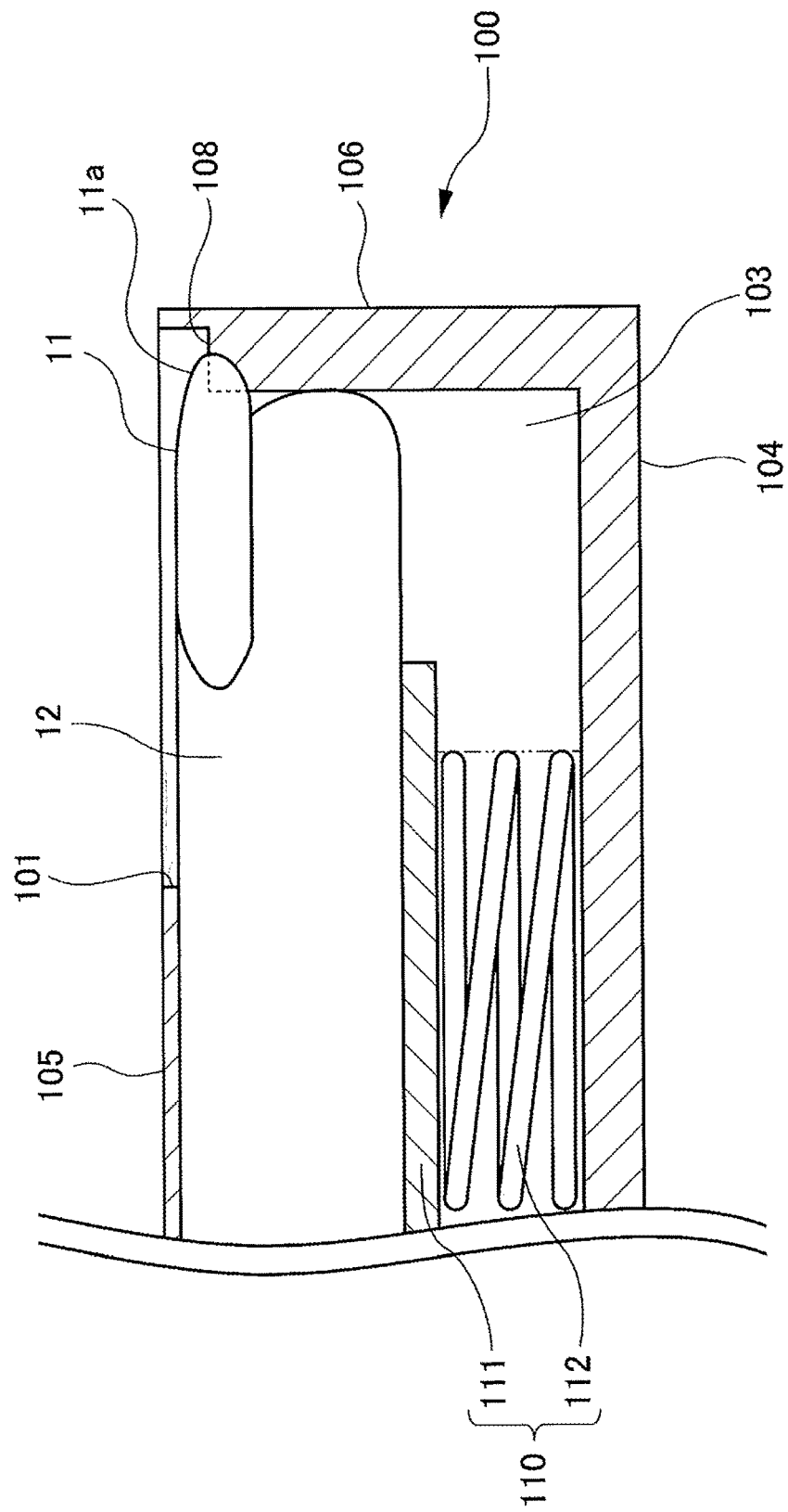
FIG. 5 is a sectional view of the finger insertion case cut by a B-B line in FIG. 4A and viewed.

FIG. 5 is a sectional view of the finger insertion case 100 cut by a B-B line in FIG. 4A and viewed.

As illustrated in FIGS. 3 and 5, the finger insertion case 100 exhibits a cylindrical shape as a whole to surround the finger 12.

To be specific, the finger insertion case 100 includes right and left side surfaces 103 having recessed grooves 102, a bottom surface 104 linked to lower end portions of the right and left side surfaces 103, a top surface (first surface) 105 linked to upper end portions of the right and left side surfaces 103, and including the opening area 101 that exposes the nail 11, and a depth surface 106 linked to the right and left side surfaces (second surfaces) 103 provided in a direction intersecting with the top surface 105 and the bottom surface 104, and provided at a depth side in a finger inserting direction.

Then, the finger insertion case 100 includes a finger insertion opening 107 at a front side in the finger inserting direction, and a nail placing portion 108 for allowing a nail tip portion 11a of the nail 11 to be placed, for example, in an inner upper end portion of the depth surface 106.

The nail placing portion 108 keeps the position of the nail 11 in an up and down direction constant by allowing the nail tip portion 11a of the nail 11 to be placed thereon.

Providing the nail placing portion 108 in the inner upper end portion of the depth surface 106 is not essential. A configuration without including the nail placing portion 108 may be employed.

(Configuration of Pressing Mechanism)

A pressing mechanism 110 that presses the finger 12 toward the top surface 105 (first surface) is provided on the bottom surface 104 of the finger insertion case 100.

The pressing mechanism 110 includes a pressing plate 111 extending along the bottom surface 104 of the finger insertion case 100 and movable in the up and down direction, and a spring 112 provided between the bottom surface 104 of the finger insertion case 100 and the pressing plate 111, and which energizes the pressing plate 111 upward (see FIGS. 4D and 5).

When inserting the finger 12 into the finger insertion case 100, the user holds the finger insertion case 100 with the other hand, and inserts the finger 12 into the finger insertion case 100 while pressing down the pressing plate 111 with the inserted finger 12.

When the user cancels press-down force against the pressing plate 111 after placing the nail tip portion 11a of the nail 11 of the inserted finger 12 on the nail placing portion 108, the pressing plate 111 rises by energizing force of the spring 112. Further, the finger 12 is pressed toward the top surface 105 of the finger insertion case 100, and an upper surface of the finger 12 comes in contact with a lower surface of the top surface 105. Accordingly, movement of the finger 12 is suppressed.

Note that the pressing plate 111 may be configured to be held in a pressed state in the first pressing, and to rise in the second pressing, for example.

(Height Measurement Scale Marks)

A first area 103a which is at least a part of the right and left side surfaces (second surfaces) 103 of the finger insertion case 100, corresponding to the nail 11, are formed of a material having transparency (for example, a transparent material) that allows the nail 11 to be visually recognizable through the first area 103a.

Accordingly, a side surface of the nail 11 can be viewed from an outside of the finger insertion case 100 (see FIGS. 4B and 4C).

Examples of the transparent material include acrylic and polycarbonate.

Further, a plurality of scale marks 109 that indicates a distance from the top surface 105 (first surface) and is arranged at predetermined pitches (1-mm pitches, for example) in the up and down direction from the top surface 105 sides as starting points, is provided on the first area 103a of the right and left side surfaces 103 of the finger insertion case 100.

According to such scale marks 109, the user views the side surface of the nail 11 from a side of the finger insertion case 100, and reads the scale mark 109 seen to overlap with the side surface of the nail 11, in the state where the finger 12 is inserted in the finger insertion case 100, thereby to accurately measure the height of the nail 11 (the height of a maximum width position).

Note that numerical values that indicate the numbers of the scale marks 109 from the top surface 105 side or numerical values that indicate the distance from the top surface 105 side may be added to the right side or left side of the scale marks 109 in an alternate or one by one manner (Cover Plate and Width Measurement Scale Marks)

The finger insertion case 100 includes a cover plate 120 slidably provided along an extending direction of the top surface (first surface) 105, and capable of opening/closing the opening area 101 that exposes the nail 11 (see FIGS. 3 and 4A).

A second area 120a which is at least a part of the cover plate 120, corresponding to the nail 11, is formed of a material having transparency (for example, a transparent material) that allows the nail 11 to be visually recognizable through the second area 120a when the opening area 101 is closed, and is provided with a plurality of scale marks 121 arranged along a right and left direction (a direction crossing the inserting direction of the finger 12) at predetermined pitches (for example, 1-mm pitches) that indicates a distance along the right and left direction.

According to such scale marks 121, the user views an upper surface of the nail 11 from right above the finger insertion case 100, and reads the scale mark 121 seen to overlap with the upper surface of the nail 11, thereby to accurately measure the width (maximum width) of the nail 11.

Note that numerical values indicating the numbers of the scale marks 121 or numerical values indicating the distance from a central position, where the central position of the scale marks 121 is "0", may be added to the front side or the rear side of the scale marks 121 in an alternate or one by one manner toward the right and left directions.

The top surface 105 of the finger insertion case 100 includes right and left guide grooves 122 along right and left both end portions thereof, and the cover plate 120 is slidably supported as the right and left both end portions are engaged with the guide grooves 122.

The top surface 105 of the finger insertion case 100 includes a coming-off prevention portion 123 in a depth-side end portion in the finger inserting direction. The cover plate 120 is regulated to a position to close the opening area 101 when coming in contact with the coming-off prevention portion 123, and the scale marks 121 overlap with the nail 11.

(Insertion of Finger Insertion Case to Insertion Guide)

A stopper 34 that comes in contact with an insertion-side front end of the cover plate 120 and allows the cover plate 120 to slide to open the opening area 101, when the finger insertion case 100 is inserted into the first finger insertion area 23 (of the insertion guide 30), is provided at the drawing device main body 10a side. That is, the stopper 34 is provided in an upper wall portion 33 of the insertion guide 30.

According to such a stopper 34, even when the finger insertion case 100 is inserted into the drawing device main body 10a side in a state where the opening area 101 remains closed by the cover plate 120, the cover plate 120 slides in a direction of opening the opening area 101 as the finger insertion case 100 is inserted. Therefore, obstruction of drawing of nail design by the cover plate 120 can be prevented.

Since the notched portion 31 is formed in the insertion guide 30 at the depth side, the opening area 101 of the finger insertion case 100 is not covered with the insertion guide 30.

By the way, a guide mechanism G that guides slide insertion/pulling-out of the finger insertion case 100 is configured between right and left side walls 32 of the insertion guide 30 and the finger insertion case 100.

The guide mechanism G is made of the recessed grooves 102 formed in lower portions of the right and left side surfaces of the finger insertion case 100, and the elongated protrusion portions 35 formed in the right and left side walls 32 of the insertion guide 30, and slidably engaged with the recessed grooves 102.

(Procedure of Measuring Dimensions of Nail)

Next, a procedure of measuring the height and the width of the nail 11, using the finger insertion case 100 according to the first embodiment of the present invention, will be described with reference to FIGS. 6A, 6B, 6C, and 6D.

Figure 6A:
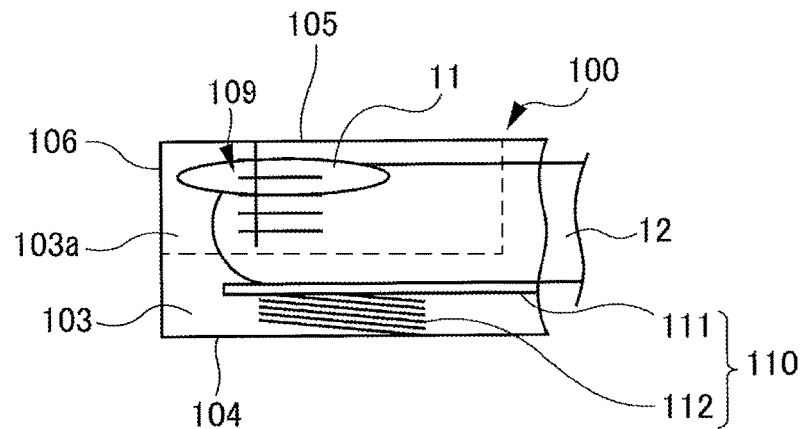
FIGS. 6A, 6B, 6C, and 6D are explanatory views illustrating a procedure in measuring the height and the width of a nail, using the finger insertion case of the drawing device according to the first embodiment of the present invention.
Figure 6B:
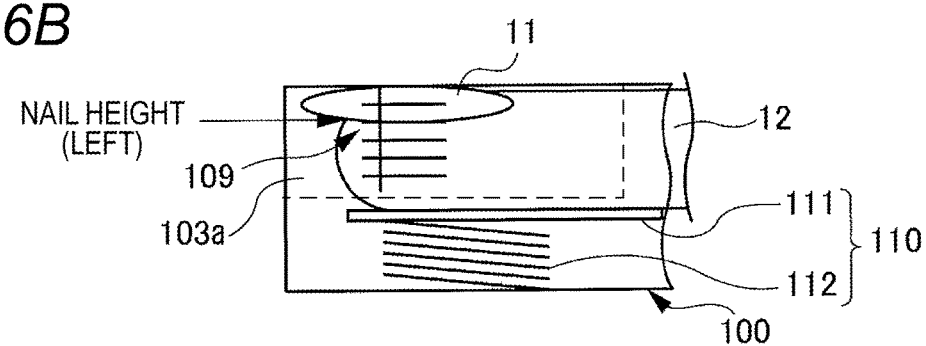
Figure 6C:
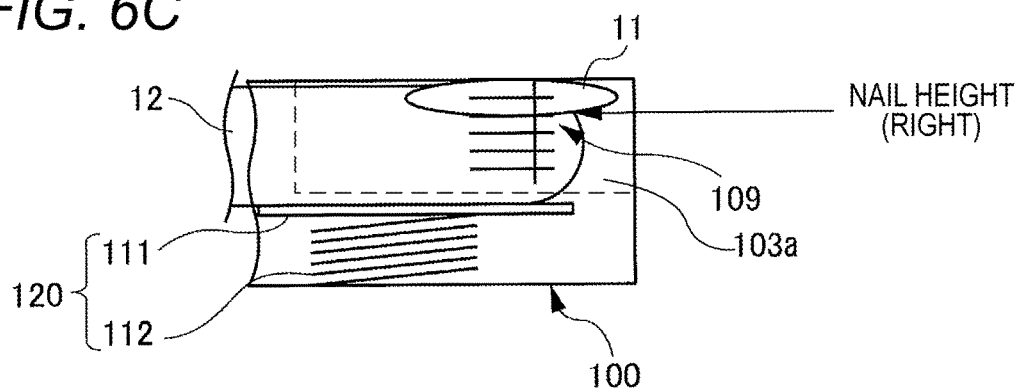
Figure 6D:
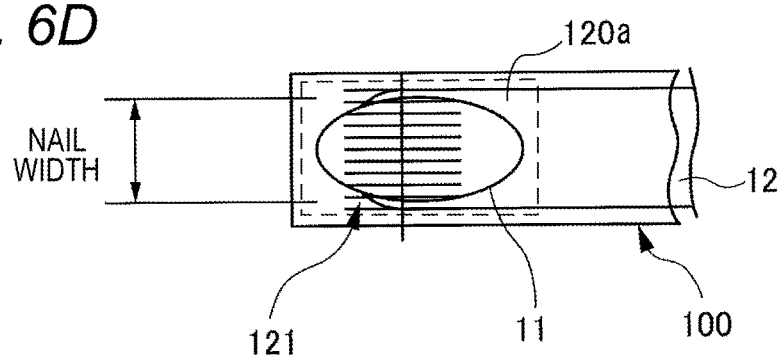

FIGS. 6A, 6B, 6C, and 6D are explanatory views illustrating a procedure of measuring the height and the width of the nail 11, using the finger insertion case 100 of the drawing device 10 according to the first embodiment of the present invention, FIG. 6A is a schematic left side view illustrating the finger insertion case 100 at the time of insertion of the finger, FIG. 6B is a schematic left side view of the finger insertion case 100 illustrating a state of measuring the height of the nail 11 from a left side, FIG. 6C is a schematic right side view of the finger insertion case 100 illustrating a state of measuring the height of the nail 11 from a right side, and FIG. 6D is a schematic plan view of the finger insertion case 100 illustrating a state of measuring the width of the nail 11 from above.

As illustrated in FIG. 6A, when inserting the finger 12 to the finger insertion case 100, the user holds the finger insertion case 100 with the other hand, for example, and inserts the finger 12 into the finger insertion case 100 while pressing down the pressing plate 111 with the inserted finger 12, for example.

As illustrated in FIG. 6B, when the insertion of the finger 12 into the finger insertion case 100 is completed, the user cancels the press-down force against the pressing plate 111.

Accordingly, the pressing plate 111 rises by the energizing force of the spring 112, and the finger 12 is pressed toward the top surface 105 of the finger insertion case 100 and movement of the finger 12 is suppressed.

At this time, in a case where the nail placing portion 108 is provided in the inner upper end portion of the depth surface 106 of the finger insertion case 100, the user places the nail tip portion 11a of the nail 11 on the nail placing portion 108.

In this state, the user reads the scale mark 109 seen to overlap with the side surface of the nail 11 while viewing the side surface of the nail 11 from the side of the finger insertion case 100, and measures the height (the height of the maximum width position) of the nail 11.

As illustrated in FIGS. 6B and 6C, the user visually measures the height of the nail 11 from the left side, and visually measures the height of the nail 11 from the right side.

At this time, when the height of the nail 11 measured from the left side and the height of the nail 11 measured from the right side are nearly matched, the user determines that the height of the nail 11 has been accurately measured.

Meanwhile, when the height of the nail 11 measured from the left side and the height of the nail 11 measured from the right side are not matched, the user determines that the height of the nail 11 cannot be accurately measured because the finger 12 is inserted in a rolled state where the finger 12 is rotated in the right direction or in the left direction around a length direction of the finger 12 with respect to the finger insertion case 100.

After the user modifies an insertion posture of the finger 12 with respect to the finger insertion case 100 such that the height of the nail 11 measured from the left side and the height of the nail 11 measured from the right side are matched or nearly matched, measurement is performed again.

Next, as illustrated in FIG. 6D, the user measures the width (maximum width) of the nail 11 by viewing the upper surface of the nail 11 from right above the finger insertion case 100, and reading the scale mark 121 seen to overlap with the upper surface of the nail 11.

After measuring the height and the width of the nail 11, the user causes a nail information registration screen of the user on the display device 21 to be displayed on the basis of an operation of the operation device 22, and registers the measured height and width of the nail 11.

Following that, in a case of drawing nail design on the nail 11 of the finger 12 inserted in the finger insertion case 100, the user inserts the finger insertion case 100 into which the finger 12 is inserted, into the first finger insertion area 23 of the drawing device main body 10a, and performs a drawing start operation on the operation device 22.

At this time, since the finger 12 is inserted in the finger insertion case 100, the user feels that the finger 12 is in a more protected state than a case of directly inserting the finger 12 into the drawing device 10.

Therefore, fear felt by the user when directly inserting the finger 12 having the nail 11 that serves as the object to be drawn into the first finger insertion area 23 of the drawing device 10, through which an inside cannot be seen, can be relieved.

(Processor)

Figure 7:
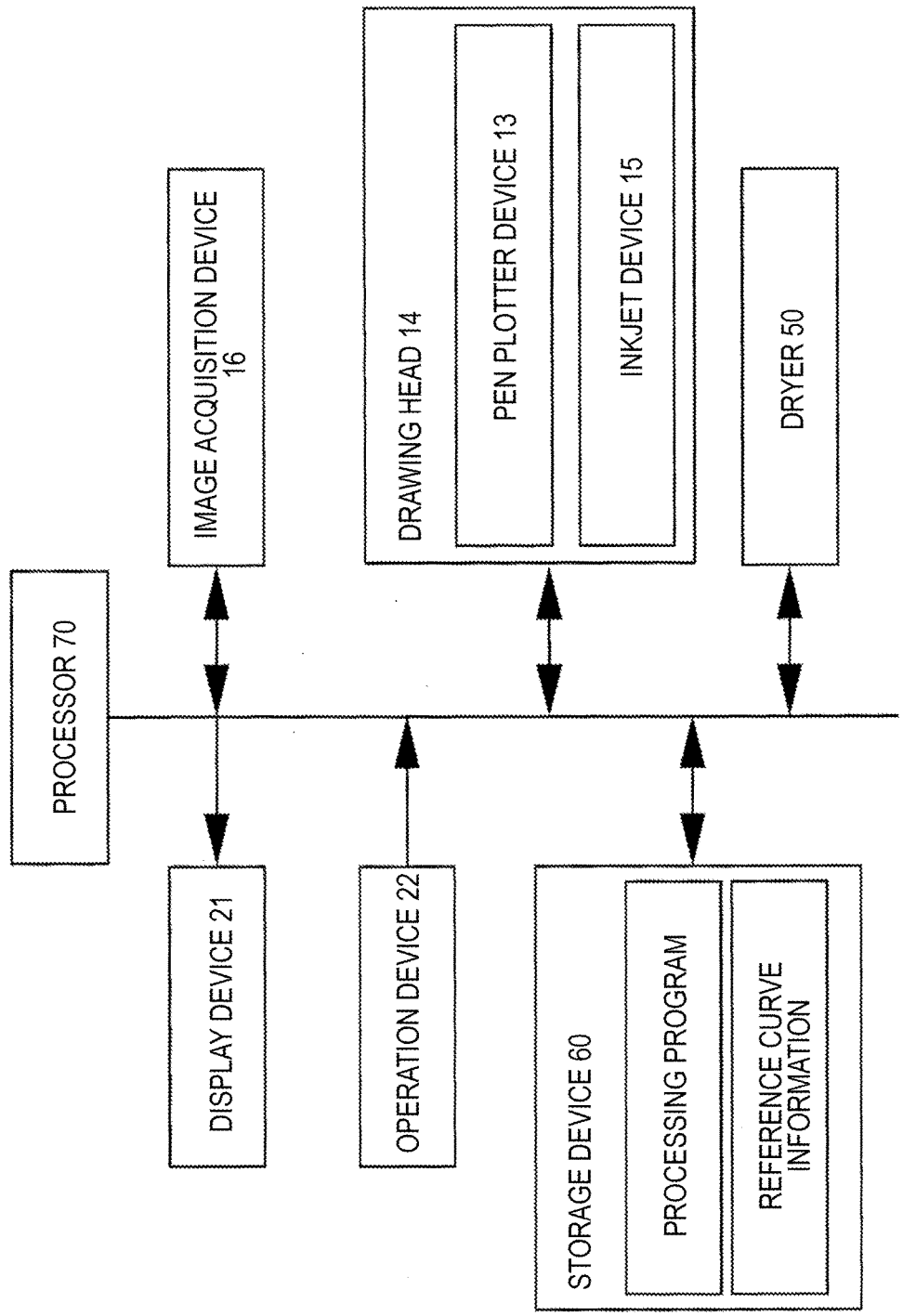
FIG. 7 is a block diagram illustrating a principal configuration of the drawing device according to the first embodiment of the present invention.

FIG. 7 is a block diagram illustrating a principal configuration of the drawing device 10.

As illustrated in FIG. 7, the drawing device 10 includes a storage device 60 that stores processing programs and reference curve information described below, and a processor 70 configured from a CPU (processor) that controls various operations on the basis of the processing programs, in addition to the drawing head 14 including the pen plotter device 13 and the inkjet device 15, the image acquisition device 16 made of a camera and the like, the display device 21 made of a liquid crystal display monitor and the like, the operation device 22, and the dryer 50 described above, and these units are connected with one another through a bus.

The storage device 60 is configured from a read only memory (ROM), a flash memory, and the like, and in which a program area in which the processing programs for realizing the various functions of the drawing device 10 and the like are stored, a data area in which data to be used in the process of forming the nail design on the nail 11 and the like are stored, and a work area in which work data generated in the processing process of forming the nail design and the like are temporarily stored are allocated.

The data to be used in the process of forming the nail design on the nail 11 includes drawing data that defines a position and a color of the nail design on the nail 11, and the drawing data is corrected according to a curved surface level of the nail 11 illustrated in FIG. 10.

The processor 70 of the present embodiment identifies the curved surface level of the nail 11 on the basis of the height measurement value and the width measurement value of the nail 11 input through the operation device 22, and corrects the drawing data according to the identified curved surface level of the nail 11.

The drawing device 10 of the first embodiment configured as described above includes the drawing device main body 10a including the drawing head 14 that performs drawing on the nail 11, and the finger insertion case 100 detachably attached to the drawing device main body 10a and provided with the pressing mechanism 110 that presses the finger 12 having the nail 11 toward the top surface 105.

The finger insertion case 100 includes the right and left side surfaces 103, the bottom surface 104 linked to the right and left side surfaces 103 and provided with the pressing mechanism 110, the top surface 105 linked to the right and left side surfaces 103 and including the opening area 101 that exposes the nail 11, and the depth surface 106 linked to the top surface 105, the right and left side surfaces 103, and the bottom surface 104, and provided at the depth side in the finger inserting direction. The first area 103a which is at least a part of the right and left side surfaces 103, corresponding to the nail 11, are formed of a transparent material, and the first area 103a includes the scale marks 109 provided from the top surface 105 sides.

Therefore, the side surface of the nail 11 is viewed from the side of the finger insertion case 100, and the scale mark 109 seen to overlap with the side surface of the nail 11 is read, whereby the height of the nail 11 can be accurately measured.

The finger insertion case 100 includes the cover plate 120 slidably provided on the top surface 105, and which covers the opening area 101. A second area 120a which is at least a part of the cover plate 120, corresponding to the nail 11, is formed of a transparent material and includes the scale marks 121 provided in the right and left direction.

Therefore, the upper surface of the nail 11 is viewed from right above the finger insertion case 100, and the scale mark 121 seen to overlap with the upper surface of the nail 11 is read, whereby the width of the nail 11 can be accurately measured.

The height and the width of the nail 11 are visually measured by the user in this way, and thus the cost is not increased.

The drawing device main body 10a includes the stopper 34 that comes in contact with and causes the cover plate 120 to slide to open the opening area 101 when the finger insertion case 100 is attached. Therefore, the finger insertion case 100 is attached to the drawing device main body 10a side in the state where the opening area 101 remains closed by the cover plate 120, and obstruction of the drawing of the nail design by the cover plate 120 can be prevented.

The guide mechanism G made of the recessed grooves 102 and the elongated protrusion portions 35 to be slidably engaged with the recessed grooves 102, and which guides the finger insertion case 100 when the finger insertion case 100 is attached to the drawing device main body 10a is included.

Accordingly, attachment of the finger insertion case 100 to the drawing device main body 10a becomes easy, and an attaching position of the finger insertion case 100 to the drawing device main body 10a can be accurately defined.

Note that the recessed grooves 102 and the elongated protrusion portions 35 of the guide mechanism G are in complementary relationship, and the elongated protrusion portions 35 may be formed on the finger insertion case 100, and the recessed grooves 102 may be formed in the insertion guide 30.

(Second Embodiment)

Next, a drawing device 10 according to a second embodiment of the present invention will be described with reference to the drawings.

Note that a configuration common to the first embodiment employs the description of the first embodiment by using the same reference sings as the first embodiment.

In the drawing device 10 of the first embodiment, the height and the width of the nail 11 have been visually measured by the user using the finger insertion case 100 detachable from the drawing device main body 10a. In contrast, a drawing device 10 of the second embodiment, a finger insertion case 100 is detachable from a drawing device main body 10a, similarly to the first embodiment, and the height and the width of a nail 11 are measured using an image acquisition device 16 provided in the drawing device 10 in a state where a finger insertion case 100 to which a finger 12 is inserted is inserted in a first finger insertion area 23.

Figure 8A:
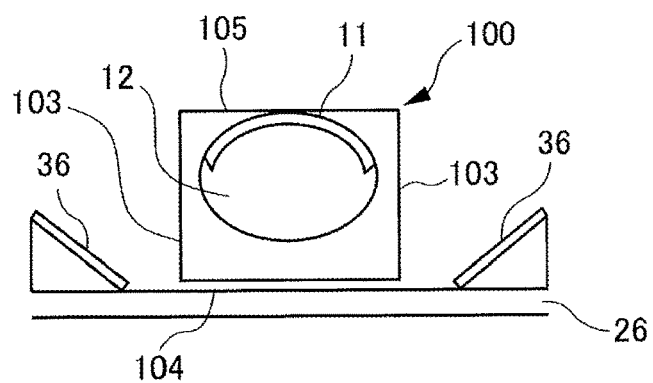
FIGS. 8A, 8B, and 8C are diagrams illustrating a principal configuration of a drawing device according to a second embodiment of the present invention.
Figure 8B:
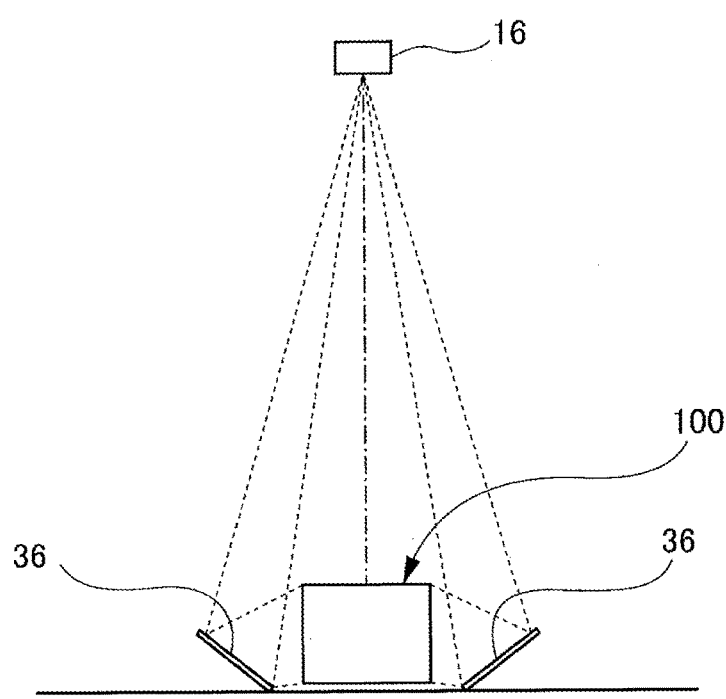
Figure 8C:
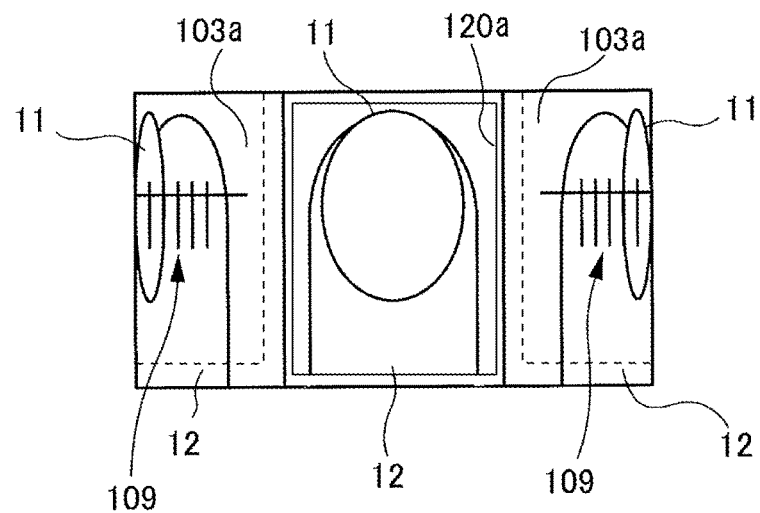

FIGS. 8A, 8B, and 8C are diagrams illustrating a principal configuration of the drawing device 10 according to the second embodiment of the present invention, FIG. 8A is a schematic front view illustrating the finger insertion case 100 and mirror units 36, FIG. 8B is a schematic front view illustrating an image capturing range of the image acquisition device 16, and FIG. 8C is a diagram illustrating an acquired image of the image acquisition device 16.

The image acquisition device 16 is installed in a position right above an opening area 101 of a top surface 105 in the finger insertion case 100.

As illustrated in FIG. 8A, the drawing device 10 includes the mirror units 36 provided in positions on the right and left sides of the first finger insertion area 23 (finger insertion case 100).

The mirror units 36 include mirrors, and are arranged in positions and at an inclined angle, where the mirrors reflect images of the right and left side surfaces 103 (second surface) sides of the first finger insertion area 23 (finger insertion case 100), and the image acquisition device 16 can obtain images of the right and left side surfaces 103 of the first finger insertion area 23, as illustrated in FIG. 8B.

Here, an image capturing range of a camera of the image acquisition device 16 is a range including at least the right and left mirror units 36.

Since the mirror units 36 are provided in this way, the image acquisition device 16 can acquire an image of the nail 11 as viewed from above, an image in which a left side surface of the nail 11 and scale marks 109 overlap with each other, and an image in which a right side surface of the nail 11 and the scale marks 109 overlap with each other, at the same time, as illustrated in FIG. 8C.

Note that the image captured through an opening area 101 may be called first image, and images obtained by capturing reflected images of the right and left side surfaces 103

(second surfaces) side of the finger insertion case 100, which have been reflected at the mirror units 36, may be called second images.

In the present example, the first image is an image of the nail 11 as viewed from above, and the second images are an image in which the left side surface of the nail 11 and the scale marks 109 overlap with each other and an image in which the right side surface of the nail 11 and the scale marks 109 overlap with each other.

A processor 70 processes the image of the nail 11 as viewed from above, which has been acquired in the image acquisition device 16, by a known image processing technology and the like, and automatically measures the width of the nail 11.

Meanwhile, the image in which the left side surface of the nail 11 and the scale marks 109 overlap with each other and the image in which the right side surface of the nail 11 and the scale marks 109 overlap with each other are displayed on a display device 21, so that a user can read the height of the nail 11 on a screen of the display device 21 and can input a value through an operation device 22.

By the way, in the images of the right and left side surfaces 103 of the first finger insertion area 23, which have been reflected at the mirror units 36, an error is caused between a height position of the nail 11 and a position of the scale mark 109 because the mirror units 36 are inclined with respect to the right and left side surfaces 103 of the finger insertion case 100. Therefore, appropriate correction processing is necessary. Hereinafter, the correction processing will be described.

Figure 9A:
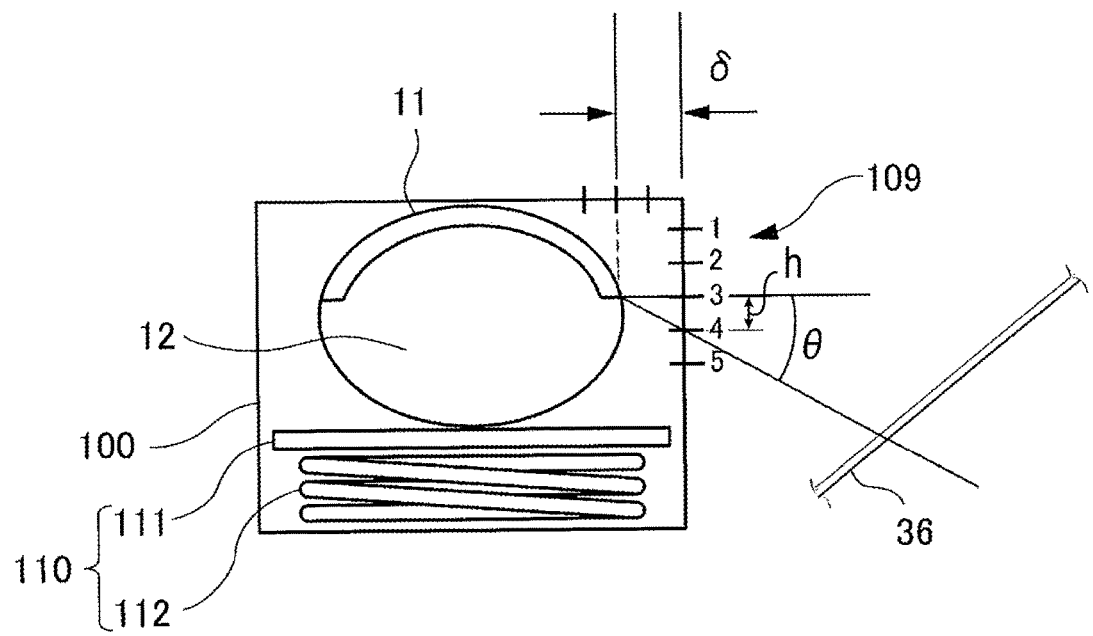
FIGS. 9A and 9B are explanatory views illustrating processing of correcting measurement of the height of a nail, of the drawing device according to the second embodiment of the present invention.
Figure 9B:
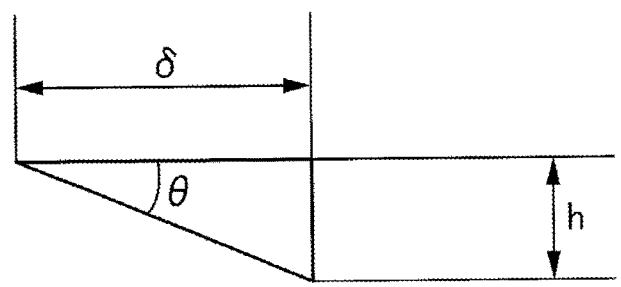

FIGS. 9A and 9B are explanatory views illustrating processing of correcting measurement of the height of a nail, of the drawing device according to the second embodiment of the present invention, FIG. 9A is a sectional view, and FIG. 9B is an enlarged view of an error h.

For example, as illustrated in FIG. 9A, a lower end position of a side surface of the nail 11 overlaps with a vicinity of "3" of the scale marks 109, as viewed from a side. While the height of the nail 11 is supposed to be measured to be "3", the lower end portion overlaps with "4" of the scale marks 109 from the relationship with the inclined angle in the mirror unit 36, and thus the height of the nail 11 is identified to be "4", in the image reflected at the mirror unit 36. Therefore, in this case, an error h of one scale mark is caused.

This error h can be calculated using a distance δ between an end portion of the nail 11 in a width direction and the side surface 103 of the first finger insertion area 23, and correction angles θ respectively set to the plurality of scale marks 109 as different values from one another.

To be specific, the distance δ is acquired from a camera image of a plane of the nail 11, which has been acquired by the image acquisition device 16, the error h is obtained by [δ×tan θ], the error h is subtracted from the scale mark value read from the side surface image of the nail 11, which has been acquired by the image acquisition device 16, and the subtracted value is further rounded off to the closest whole number, whereby the calculated value is employed as a correct integer scale mark value.

In the example illustrated in FIGS. 9A and 9B, the distance δ is 2 mm, the angle θ is 25°, and thus the error h becomes 0.93. Therefore, a theoretical scale mark value after subtraction of the error h becomes 3.07.

Further, the theoretical scale mark value is round off, and the correct scale mark value becomes "3".

Note that, in reality, this calculation processing is automatically performed in the processor 70. The user simply inputs, through the operation device 22, the scale mark value read from the side surface image of the nail 11 displayed on the display device 21 as it is.

Here, the angles θ can be set at the time of manufacturing the drawing device according to the position (distance) of the image acquisition device 16, the inclined angle of the mirror unit 36, and the like, and the relationship between the angles θ and the scale marks is stored in a storage device 60.

When the height and the width of the nail 11 as an object to be drawn are input, the processor 70 identifies a curved surface level of the nail 11, performs correction of drawing data according to the identified curved surface level, and controls a drawing head 14 to apply nail design to the nail 11, similarly to the first embodiment.

A drawing device 10B configured as described above of the second embodiment includes the drawing head 14 that performs drawing on the nail 11, the image acquisition device 16 that acquires an image of the nail 11, the first finger insertion area 23 including a top surface 105 including the opening area 101 that exposes the nail 11 and the right and left side surfaces 103 linked to the top surface 105, and into which the finger 12 having the nail 11 is inserted, a pressing mechanism 110 provided in the first finger insertion area 23, and which presses the finger 12 toward top surface 105, and the mirror units 36 provided in the positions on the right and left sides of the first finger insertion area 23, and which reflects the images of the right and left side surfaces 103 of the first finger insertion area 23 toward the image acquisition device 16.

Then, at least the areas corresponding to the nail 11, of the right and left side surfaces 103 of the first finger insertion area 23, are formed of a transparent material, and the right and left side surfaces 103 include the scale marks 109 provided from the top surface 105 sides. Therefore, the scale marks 109 overlapping with the right and left side surfaces of the nail 11, which have been reflected at the mirror units 36, are read from the display device 21, whereby the height of the nail 11 can be measured.

As the image acquisition device 16 that acquires the camera images of the height and the width of the nail 11, one usually provided in the drawing device 10B can be used. Therefore, in essence, the right and left side surfaces 103 of the first finger insertion area 23 (finger insertion case 100) are formed of a transparent material, and only the mirror units 36 are newly provided. Therefore, an increase in the cost of this configuration is very small.

As described above, favorable embodiments of the present invention have been described in detail. However, the present invention is not limited to the above-described embodiments, and various modifications and alternations are possible within the scope of the gist of the present invention.

In the second embodiment, the finger insertion case 100 has been detachable from the drawing device main body 10a, similarly to the first embodiment. However, the finger insertion case 100 may be configured to be fixed to the drawing device main body 10a, and not to be detachable from the drawing device main body 10a.

In the second embodiment, the width of the nail 11 has been automatically measured. However, the width of the nail 11 may be read by the user from the camera image displayed on the display device 21, similarly to the height of the nail 11.

Alternatively, the height of the nail 11 can also be automatically measured.

What is claimed is:

1. A drawing device comprising:
   an insertion case into which an object that is a finger or a toe having a nail to be drawn on is inserted, the insertion case including a first surface provided with an opening area that exposes the nail in a state in which the object is inserted and a second surface having a plane direction intersecting with a plane direction of the first surface; and
   an insertion area into which the insertion case is detachably inserted,
   wherein a first area of at least a part of the second surface has transparency so as to allow an inside of the insertion case to be visible, the first area corresponding to the nail in a state in which the object is inserted, and
   wherein a first scale mark indicating a distance from the first surface is provided in the first area of the second surface of the insertion case.

2. The drawing device according to claim 1, wherein:
   the insertion case includes a cover plate provided on the first surface, the cover plate covering at least a part of the opening area,
   the cover plate is slidable along the plane direction of the first surface,
   a second area of at least a part of the cover plate has transparency so as to allow an inside of the insertion case to be visible, the second area corresponding to the nail in a state in which the object is inserted in the insertion case and the cover plate covers the at least part of the opening area, and
   a second scale mark indicating a distance in a direction along a first direction is provided in the second area of the cover plate along the first direction, the first direction crossing an inserting direction of the object.

3. The drawing device according to claim 2, further comprising:
   a stopper configured to come in contact with and allow the cover plate to slide to open the opening area when the insertion case, in a state in which the cover plate covers the at least part of the opening area, is inserted into the insertion area.

4. The drawing device according to claim 1, further comprising:
   a drawing head configured to apply drawing to the nail exposed through the opening area of the insertion case in a state in which the insertion case, into which the object is inserted, is inserted in the insertion area.

5. The drawing device according to claim 1, wherein the insertion case includes a pressing mechanism configured to press the object toward the first surface in a state in which the object is inserted.

6. The drawing device according to claim 1, further comprising:
   an image acquisition device configured to acquire an image obtained by capturing the inside of the insertion case through the second surface of the insertion case in a state in which the insertion case is inserted in the insertion area.

7. The drawing device according to claim 6, wherein the image acquisition device further acquires an image obtained by capturing the first surface including the opening area in a state in which the insertion case is inserted in the insertion area.

8. The drawing device according to claim 7, further comprising:
   a mirror unit which has at least one mirror provided in a position where the mirror unit reflects an image of the second surface side of the insertion case into a direction where the image acquisition device is able to capture the image in a state in which the insertion case is inserted in the insertion area; and
   a display device,
   wherein the image acquisition device acquires a first image obtained by capturing the nail exposed through the opening area and a second image obtained by capturing an image of a second surface side of the object through the mirror unit in a state in which the insertion case, in which the object is inserted, is inserted in the insertion area, and
   wherein the first image and the second image are displayed on the display device.

9. The drawing device according to claim 8, further comprising:
   a processor,
   wherein:
   the mirror unit is provided in a position inclined with respect to the second surface,
   the second image includes an image obtained by capturing the first scale mark, and
   the processor includes a unit that corrects a value of a height of the nail read by a user from the image of the first scale mark in the second image displayed on the display device, and input by the user to the drawing device, based on an inclined angle of the mirror unit with respect to the second surface.

10. The drawing device according to claim 1, further comprising:
    a guide mechanism configured to guide insertion of the insertion case when the insertion case is inserted into the insertion area,
    wherein:
    the guide mechanism comprises a recessed groove and an elongated protrusion portion slidably engageable with the recessed groove,
    one of the insertion area and the insertion case is provided with the recessed groove, and
    the other of the insertion area and the insertion case is provided with the elongated protrusion portion.

11. An insertion case into which an object that is a finger or a toe having a nail to be drawn on is inserted, the insertion case comprising
    a first surface provided with an opening area that exposes the nail in a state in which the object is inserted and a second surface having a plane direction intersecting with a plane direction of the first surface,
    wherein:
    a first area of at least a part of the second surface has transparency so as to allow an inside of the insertion case to be visible, the first area corresponding to the nail in a state in which the object is inserted,
    the insertion case is detachably inserted into a drawing device that applies drawing to the nail, and
    a first scale mark indicating a distance from the first surface is provided in the first area of the second surface of the insertion case.

12. The insertion case according to claim 11, further comprising:
    a cover plate provided on the first surface, the cover plate covering at least a part of the opening area,
    wherein:
    the cover plate is slidable along the plane direction of the first surface,
    a second area of at least a part of the cover plate has transparency so as to allow an inside of the insertion case to be visible, the second area corresponding to the nail in a state in which the object is inserted in the insertion case and the cover plate covers the at least part of the opening area, and a second scale mark indicating a distance in a direction along a first direction is provided in the second area of the cover plate along the first direction, the first direction crossing an inserting direction of the object.

13. The insertion case according to claim 11, further comprising:

a pressing mechanism configured to press the object toward the first surface in a state in which the object is inserted.

14. A drawing device comprising:

an insertion case into which an object that is a finger or a toe having a nail to be drawn on is inserted, the insertion case including a first surface provided with an opening area that exposes the nail in a state in which the object is inserted and a second surface having a plane direction intersecting with a plane direction of the first surface;

an insertion area into which the insertion case is detachably inserted; and an image acquisition device, wherein a first area of at least a part of the second surface has transparency so as to allow an inside of the insertion case to be visible, the first area corresponding to the nail in a state in which the object is inserted, and wherein the image acquisition device is configured to acquire an image obtained by capturing the inside of the insertion case through the second surface of the insertion case in a state in which the insertion case is inserted in the insertion area.

15. The drawing device according to claim 14, further comprising:

a drawing head configured to apply drawing to the nail exposed through the opening area of the insertion case in a state in which the insertion case, into which the object is inserted, is inserted in the insertion area.

16. The drawing device according to claim 14, wherein the insertion case includes a pressing mechanism configured to press the object toward the first surface in a state in which the object is inserted.

17. The drawing device according to claim 14, wherein the image acquisition device further acquires an image obtained by capturing the first surface including the opening area in a state in which the insertion case is inserted in the insertion area.

* * * * *